UNITED STATES PATENT OFFICE.

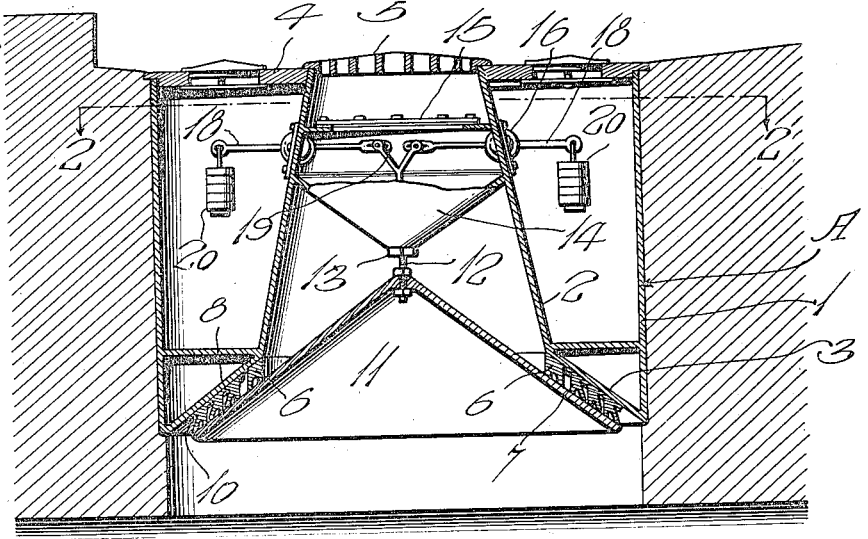

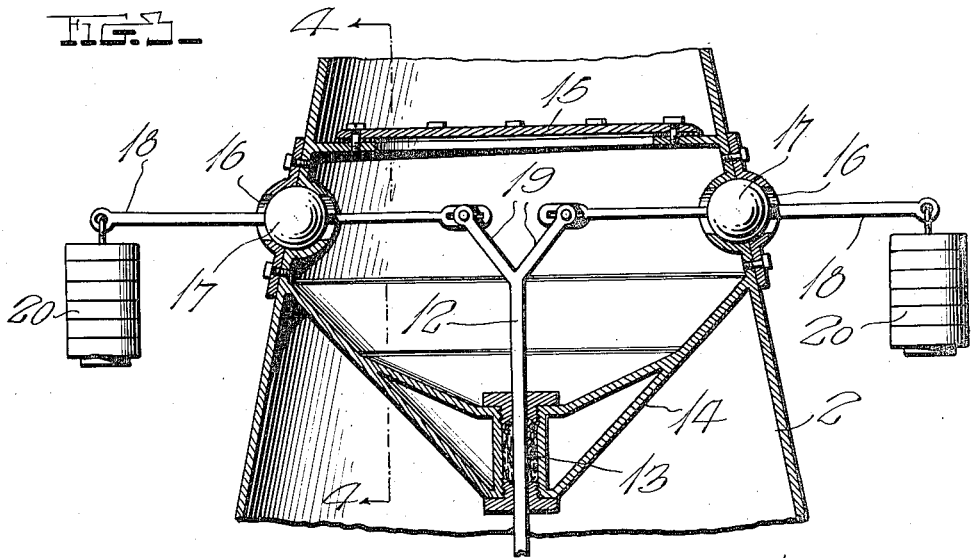
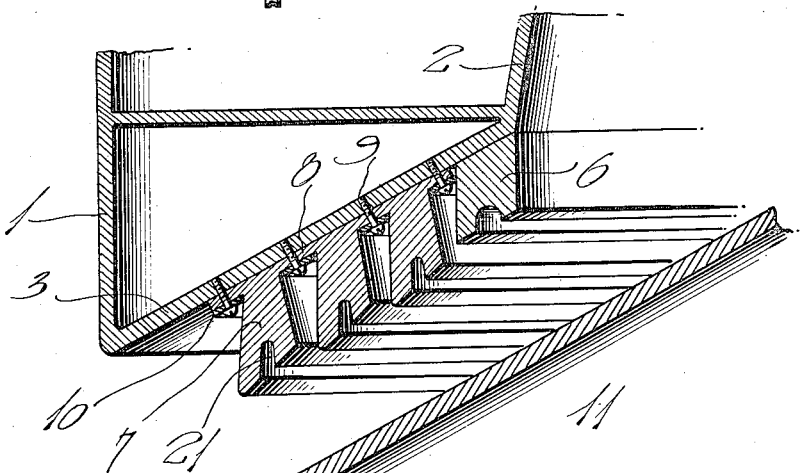
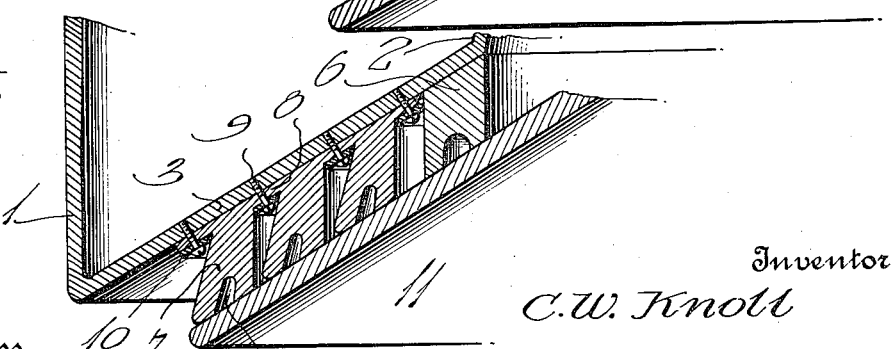

CHARLES W. KNOLL, OF CRETE, NEBRASKA.

SEAL DEVICE FOR SEWERS.

1,272,460.      Specification of Letters Patent.      Patented July 16, 1918.

Application filed December 1, 1917. Serial No. 204,816.

*To all whom it may concern:*

Be it known that I, CHARLES W. KNOLL, a citizen of the United States, residing at Crete, in the county of Saline and State of Nebraska, have invented certain new and useful Improvements in Seal Devices for Sewers; and I do declare the following to be a full, clear, and exact description of the invention, such as will enable others skilled in the art to which it appertains to make and use the same.

This invention relates to certain new and useful improvements in seal devices for sewers, the primary object being to provide an automatically operated sewer valve by means of which accumulated water will be automatically discharged into the sewer and the escape of the sewer gas prevented. The invention differs from other similar devices by novel features of construction, and the combination and arrangement of parts as will be hereinafter more fully described and claimed.

The preferred form of the invention is illustrated in the accompanying drawings which form a part of the application and in which similar reference characters are used to designate like parts throughout the several views.

In these drawings:

Figure 1 is a vertical sectional view through a seal device or valve constructed in accordance with this invention;

Fig. 2 is a horizontal sectional view of the same taken on the plane indicated by the line 2—2 of Fig. 1;

Fig. 3 is an enlarged vertical sectional view of a portion of the device;

Fig. 4 is a transverse sectional view of the housing taken at the plane indicated by the line 4—4 of Fig. 3;

Fig. 5 is a sectional view of a portion of the valve seat and valve, showing the latter in its opened position, and, Fig. 6 is a similar view of the valve seat and valve, the valve, however, being shown closed.

Referring more particularly to the drawings, the letter A designates a sewer opening which is cylindrical in shape and in which the seal device is placed. This device consists of an outer shell 1 of tubular shape, and thus forms a lining for the sewer opening A. Disposed centrally within the outer shell 1 is an inner shell or tubular element 2, the latter preferably being of frusto conical shape as shown and having its lower end flared outwardly to meet the lower end of the shell 1 to form in connection with other elements to be hereinafter described, a valve seat. The numeral 4 designates a cover plate which fits upon the upper end of the shell 1 and closes the open annular space between the two shells. The central portion of this cover plate 4 is provided with an opening into which the upper end of the shell 2 fits and over which a grate 5 is fitted. It will thus be seen that the sewerage will only pass through the grate 5 and through the inner shell 2 on its way into the sewer.

The lower flared end of the shell 2 has secured to it in any suitable manner a metal strip 6, the latter being disposed at the corner formed by the lower end of the body portion of the shell 2 and the flared portion 3 of the same. Secured also to this portion 3 is a plurality of annular rubber strips 7, the latter being arranged concentrically around the strip 6 and being preferably connected at their upper ends by webs 8. While any suitable means may be employed to secure these rubber strips to the flared portion 3 of the shell 2, yet this is conveniently and perferably done by means of screws 9 which are extended through the webs 8 and through the circular metal strips 10 disposed flat against the lower side of said webs.

The numeral 11 represents a conical valve from the upper end of which projects a rod 12. This rod 12 extends through a packing device 13 arranged in the lower end of a housing 14, the latter being comparatively narrow and extending diametrically across and within the inner shell 2, thereby providing passages on opposite sides of this housing. Access to the interior of the housing 14 may be had by removing a cover plate 15 from the upper side of the same. The ends of the housing 14 are provided with sockets 16 which receive the intermediate ball-shaped portions 17 of a pair of levers 18 to provide a suitable pivotal mounting for these levers. These levers 18 have their inner ends disposed within the housing 14 and loosely connected to the upper ends of the arms 19 of the fork-shaped upper end of the rod 12, while their outer ends extend into the space disposed between the shells 1 and 2 and have weights 20 suspended from the same. These weights 20 are sufficient to overbalance the weight of the valve 11 and rod 12 and hold the valve in its closed position, to prevent the sewer gas from passing out of the sewer and through the shell 2 into the atmosphere. However, when a predetermined quantity of water collects in the shell 2 above the valve 11, the weight of this water will overbalance the weights 20 and cause the valve to open, thus allowing the water to flow into the sewer.

The lower edges of the rubber strips 7 have annular grooves 21 therein, and these edges are cut off at such angles that when the valve 11 is moved upwardly, one side of them will be first engaged by the valve. This results in bending the strips until their lower edges are disposed flat against the upper side of the valve and their grooves 21 are widened so as to produce a suction which prevents the valve from being easily unseated and renders the same air-tight. The upward movement of the valve is limited by the metal strip 6. This also prevents the rubber strips 7 from being bent far enough out of their normal position to become damaged.

It is obvious that the device above described may be readily and easily placed in a sewer opening, and when positioned therein, it will operate automatically to allow the accumulated water to pass into the sewer, but it will prevent the sewer gas from escaping out of the same. It is obvious that numerous changes in form, proportion and in the minor details of construction may be resorted to without departing from the spirit of this invention, and hence I do not wish to be limited to the construction herein shown and described other than as set forth in the appended claims.

I claim:

1. In a device of the character described, the combination of an outer shell, an inner shell disposed centrally within the outer shell, a cover plate for closing the upper end of the space between said shells, a valve seat formed at the lower end of the inner shell, a vertically movable valve for said seat, a narrow housing extending diametrically across and within the inner shell, a rod projecting upwardly from said valve and extending through the lower part of said housing into the same, levers pivotally mounted intermediate of their ends to said housing and having their inner ends connected to said rod, said levers extending through said housing and the inner shell and into the space between said shells, and weights carried at the outer ends of said levers.

2. In a device of the character described, the combination of an outer shell, an inner shell disposed centrally within the outer shell, a cover plate for closing the upper end of the space between said shells, a valve seat formed at the lower end of the inner shell, a vertically movable valve for said seat, a narrow housing extending diametrically across and within the inner shell, a rod projecting upwardly from said valve and extending through the lower part of said housing into the same, the upper end of said rod being Y-shaped, a pair of oppositely extending levers pivoted intermediate of their ends to said housing and having their inner ends connected to the arms of the Y-shaped portion of said rod, the other ends of said levers extending into the space between said shells, and weights suspended from said other ends of said levers.

3. In a device of the character described, the combination of an outer cylindrical shell, an inner frusto conical shaped shell disposed centrally within the outer shell and having its lower end flared outwardly to form a valve seat, a cover plate for closing the upper end of the space between said shells, a conical shaped vertically movable valve for said seat, a rod extending upwardly from the apex of said valve, a lever fulcrumed intermediate of its ends to the inner shell and having its inner end connected to the upper end of said rod, the upper end of said lever extending into the space between said shells, and a weight suspended from said outer end of said lever.

4. In a sewer, a tubular inlet member, a closed housing within and extending across and spaced from the inner surface of said inlet member to provide a passage past the housing, a valve to close the lower end of said inlet member, a rod connected to said valve and extending into said closed housing, a lever fulcrumed in the wall of said tubular member and having its inner end connected to said rod and protected by said housing, and means coöperative with said lever for yieldingly holding said valve closed.

5. In a device of the character described, the combination of an outer shell, an inner shell disposed centrally within the outer shell and having its lower end flared outwardly and downwardly, concentrically arranged strips of flexible material secured to the lower side of the flared lower end of said inner shell to form a valve seat, the lower sides of said strips being provided with grooves therein, a conical shaped vertically movable valve for engagement with the lower sides of said strips, and means connected to said valves for normally holding the same closed.

6. In a device of the character described, the combination of an outer shell, an inner shell disposed centrally within the outer shell and having its lower end flared outwardly and downwardly, concentrically arranged annular strips of rubber secured to the lower side of the flared portion of said inner shell, the lower edges of said strips being provided with annular grooves, a metallic annular strip secured to the lower side of the flared portion of the inner shell, a conical shaped vertically movable valve for engagement with the lower edges of said rubber strips and when engaging the same bending them to widen said grooves, said metal strip limiting the upward movement of said valve, and means connected with the latter for normally holding the same closed.

In testimony whereof I have hereunto set my hand in the presence of two subscribing witnesses.

CHARLES W. KNOLL.

Witnesses:
 JOHN TULLY,
 ED. J. ARON.